(12) United States Patent
Enenkel

(10) Patent No.: US 6,503,044 B1
(45) Date of Patent: Jan. 7, 2003

(54) METHOD FOR EMPTYING PARCEL CONTAINERS

(75) Inventor: Peter Enenkel, Constance (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/762,370
(22) PCT Filed: Aug. 2, 1999
(86) PCT No.: PCT/DE99/02407
§ 371 (c)(1), (2), (4) Date: Feb. 2, 2001
(87) PCT Pub. No.: WO00/07745
PCT Pub. Date: Feb. 17, 2000

(30) Foreign Application Priority Data

Aug. 4, 1998 (DE) .......................................... 198 35 233

(51) Int. Cl.$^7$ ................................................. B07C 1/02
(52) U.S. Cl. ....................................... 414/404; 414/403
(58) Field of Search ................................. 414/403, 404, 414/281, 286, 280, 807, 810

(56) References Cited

U.S. PATENT DOCUMENTS

| | | | | |
|---|---|---|---|---|
| 3,757,939 A | * | 9/1973 | Henig | 209/559 |
| 4,005,792 A | * | 2/1977 | Schulman et al. | 414/416.09 |
| 4,579,501 A | * | 4/1986 | Fox | 414/347 |
| 4,963,251 A | * | 10/1990 | Bohm et al. | 198/370.03 |
| 5,101,963 A | * | 4/1992 | Skarlupka et al. | 198/475.1 |
| 5,263,701 A | * | 11/1993 | Kleinhen | 220/4.28 |
| 5,906,468 A | * | 5/1999 | Vander Syde et al. | 414/403 |
| 6,135,697 A | * | 10/2000 | Isaacs et al. | 414/280 |

* cited by examiner

Primary Examiner—Kathy Matecki
Assistant Examiner—Charles A. Fox
(74) Attorney, Agent, or Firm—Philip G. Meyers

(57) ABSTRACT

In the device for emptying of rectangular open-top mail piece containers (1) featuring lateral guiding elements (2), the mail piece containers (1) are guided and shifted on lateral guiding tracks (3). The bottom of the mail piece container (1) features continuous recesses (11) that extend in the shifting direction. Between the guiding tracks (3) freely protruding supporting fingers (6) are provisioned that are oriented in a direction toward the shifting direction. The recesses (11) in the container bottom and the supporting fingers (6) are dimensioned and positioned in such a way that the supporting fingers (6) move into the recesses (11) underneath the mail pieces, when the mail piece container (1) is shifted in its position.

Figure 1:
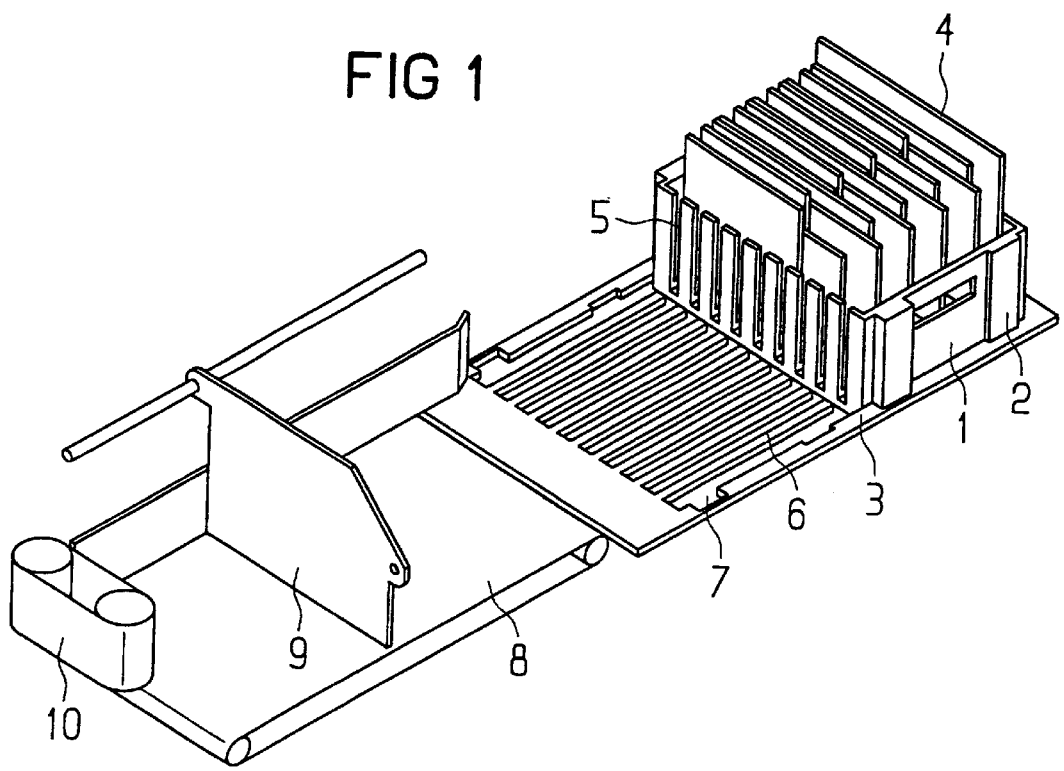

The—in the shifting direction—forward and rearward side walls of the mail piece container (1) feature, at least above the supporting fingers (6), cuts (5) that are open at the top. In the area of the supporting fingers (6) the guiding tracks (3) feature holes (7) for the support elements (2) so that at this location the mail piece containers (1) drop downward while the mail pieces remain on the supporting fingers (6).

20 Claims, 4 Drawing Sheets

METHOD FOR EMPTYING PARCEL CONTAINERS

DESCRIPTION

The invention concerns a device for emptying rectangular open-top mail piece containers. When sorting flat mail pieces in sorting machines, appropriate mail piece containers are used. On the one hand, mail piece containers are inserted into the sorting machine, into which the parcels are sorted directly and removed from the machine either manually or automatically after completion of the sorting cycle. Alternatively, the mail pieces may be sorted into rigid compartments, from which the mail pieces are then removed manually or automatically and transferred into mail piece containers. The mail pieces are stored intermediately in these containers and then processed through subsequent processing steps. These could be both a second sorting cycle on the same sorting machine, e.g., for delivery sequence sorting, or an additional sorting cycle on another sorting machine.

For emptying containers filled with mail pieces so far the following solutions have become known:

1. Tipping the container by 180° toward a loading surface (dumping the contents of the container)

In DE 195 45 716 C1 the container, in which the mail pieces are positioned in an upright standing position, is automatically pivoted onto a feeding line between two shiftable and pivotable separators for separation.

This is a rather complex solution, the mail pieces are subjected to strong forces during the pivoting process and stacking quality cannot be guaranteed.

2. Opening of one lateral wall or of the bottom of the container and emptying by dropping the mail pieces or pushing them out.

3. Pushing open an additional container bottom.

These solution variants also require rather involved auxiliary kinematic devices for lifting and lowering the mail pieces or for the opening and shutting of container bottoms and/or of lateral walls. In this process the mail pieces may also become wrongly oriented.

A solution is known from U.S. Pat. No. 4,005,792 in which the mail piece containers feature continuous bottom recesses with which supporting fingers underneath the mailpieces can engage. Subsequently, the supporting fingers and the container are moved on two levels by means of a complex mechanism in such a way that the mail pieces are pushed on a feeding bed of a material feeding device.

The invention, which is explained in Claim 1, is therefore based on the task of developing a functionally reliable device for emptying mail piece containers, in which the orientation and quality of the stacks are preserved, while the required kinematic motion processes are reduced to a minimum. The combination of the elements of supporting fingers, recesses in the container bottom, lateral guiding elements on the mail piece containers and guiding tracks with openings for the guiding elements in the area of the supporting fingers has the effect that when shifting the mail piece containers the mail pieces remain on the supporting fingers, while the mail piece container moves in a downward direction. This means that the mail pieces are not taken out of the mail piece container or removed from it by changing their position or orientation, but they remain in their positions and the mail piece container is removed with little effort.

Advantageous embodiments of the invention are explained in the subordinate claims.

According to Claim 2 it is advantageous to guide the mail piece containers during the downward movement in order to, e.g., guarantee secure stacking of these empty mail piece containers.

According to Claim 3 the empty mail piece containers advantageously arrive at a conveying device, e.g., a conveying belt for transportation to a container collecting point.

If the mail pieces are, according to Claim 4, transported in the mail piece container in a lying horizontal position, it is, according to Claim 5, advantageous to equip the supporting fingers with driven narrow transport belts permitting the transport of the mail pieces beyond the supporting fingers to a further transporting device or to workstations.

If, however, the mail pieces are stacked within the mail piece container in such a way that they stand on their narrow sides in a direction perpendicular to the direction of the shifting device according to Claim 6, the stack of mail pieces, according to an advantageous embodiment according to Claim 7, is held by means of force-adapted supports through the container wall openings and then moved further when the mail piece container has completed its downward movement. In this case as well, the mail piece stack remains uncompromised during unloading with regard to its orientation and stack quality.

By reducing the number of necessary kinematic motion processes to a minimum, semiautomatic or fully automatic emptying can be realized in a simple way. When operating the device manually, the operator holds the stack and pushes it and with it the mail piece container over the supporting fingers along the guiding tracks toward a transfer point for further treatment. The container is moved in a downward direction by gravity; i.e., no further kinematic movements or energy consumption are required. Also, a semiautomatic or fully automatic removal of the mail piece containers can be easily implemented through the movement of the mail piece containers from the processing area downward. The emptying process overall is functionally very reliable. Below, the invention is more closely described based on an embodiment example drawing. The figures show:

FIGS. 1 through 7 Perspective schematic view of the shifting movement of a full mail piece container, of the emptying of the container and of the conveyance of the mail piece stack to a separating device in various phases In this context, the shifting elements are not more closely shown. The shifting can be done manually in that the operator grabs the mail piece stack from both sides with his/her hands and pushes it with mail piece container 1 in the direction of the separator, or the shifting can be done automatically as described.

Figure 2:
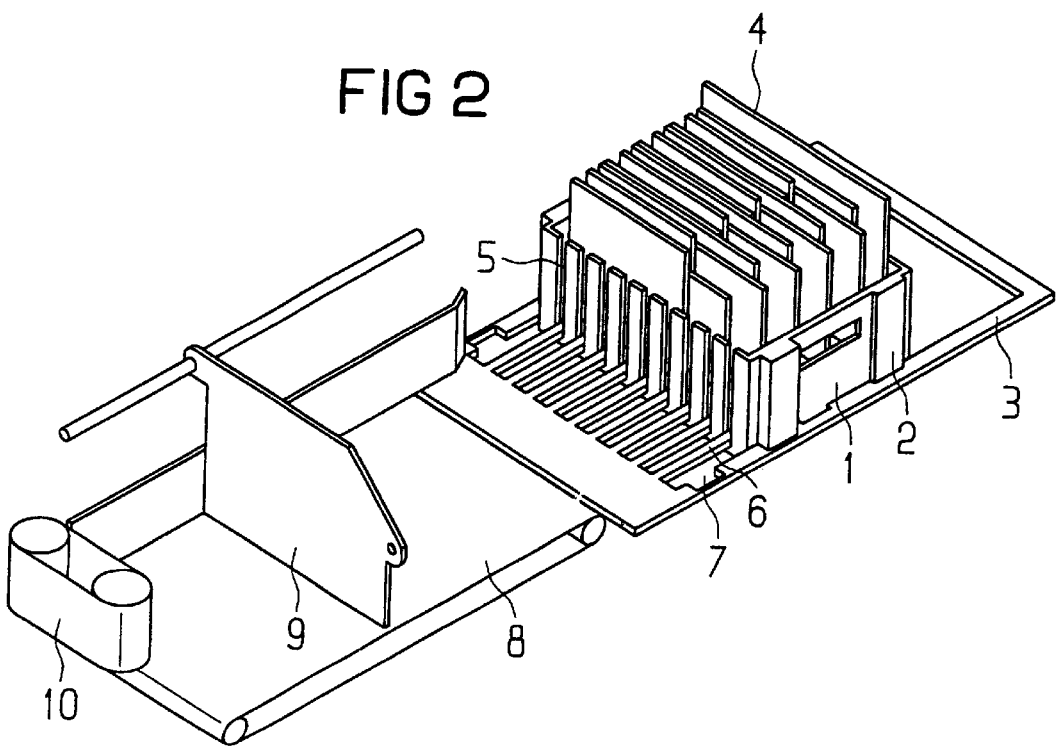
Figure 3:
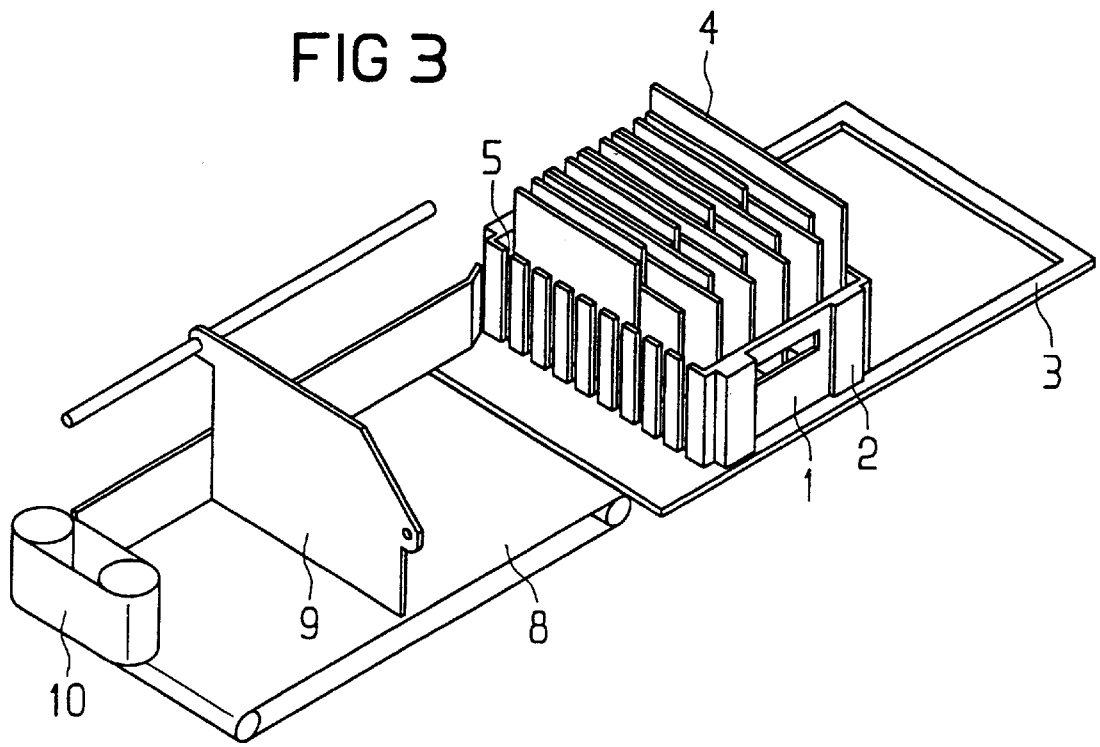
Figure 4:
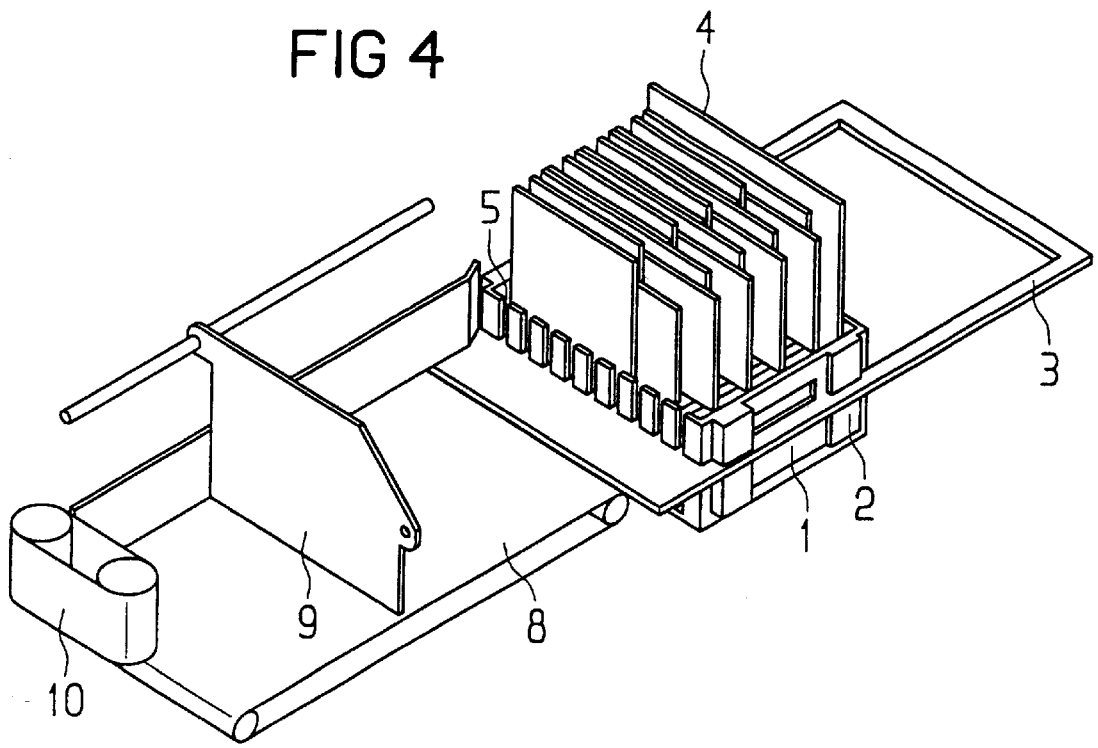
Figure 5:
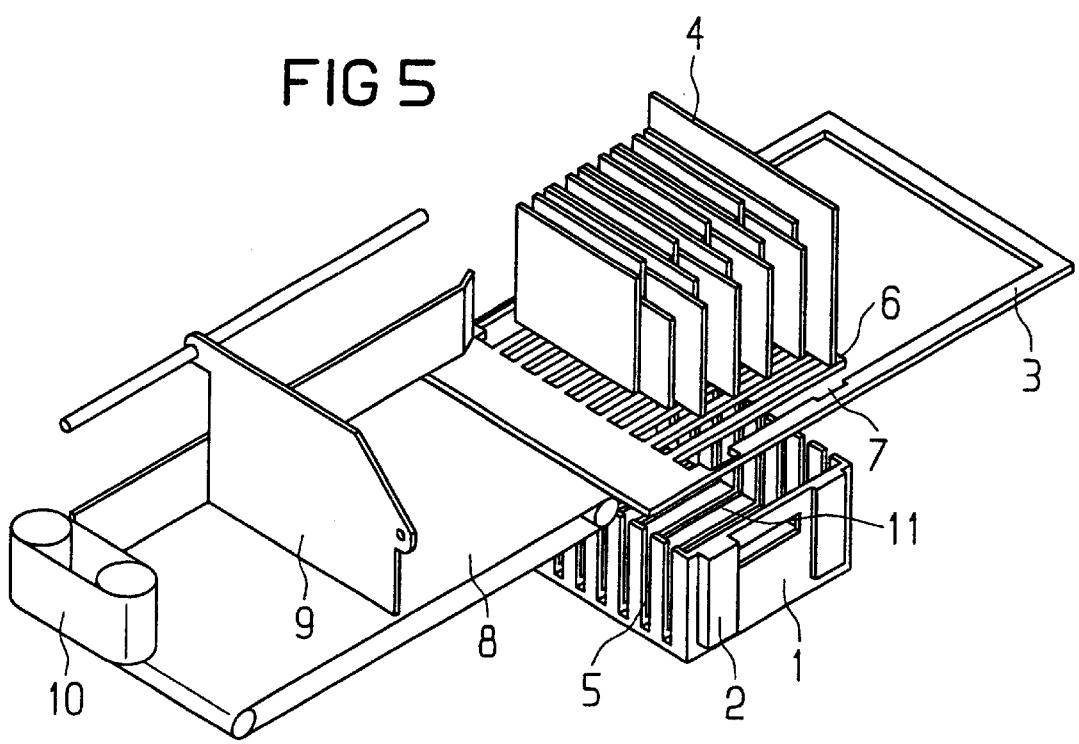

The open-top rectangular mail piece container 1, which is loaded with mail pieces 4 that are positioned perpendicular to the shifting direction, features a bottom with continuous recesses 11 that extend in the direction of the shifting movement. The—in the shifting direction—forward and rearward side walls feature, above the recesses 11, cuts 5 that are open toward the top. To the side of the mail piece container 1 guiding elements 2 are positioned by means of which the mail piece containers 1 are shifted on lateral guiding tracks 3. As shown in FIGS. 1 and 2, the container 1 with the mail pieces 4, which are aligned flush with the rear side wall, arrives in an area featuring supporting fingers 6. The supporting fingers 6 are dimensioned and positioned on a level so as to move into the recesses 11 below the mail pieces 4, when the mail piece container 1 is shifted. When the mail pieces 1 are on top of the supporting fingers 6 and when the lateral support elements arrive at the openings 7 for the support elements 6 (FIG. 3), the mail piece container 1 drops down as a result of its own gravity (FIGS. 4 and 5). Since from then on it is located below the mail piece transportation level, it can easily be transported away from there by means of a transportation device that is not shown in the drawing.

The stack of mail pieces is then pushed over the support fingers 6 to the material feeding device of a sorting machine. The device consists of a feeding bed and a discharging device, which in this case is a discharging belt 10 with a high coefficient of friction running over two rolls and grabbing each front mail piece in start-stop operation.

Figure 6:
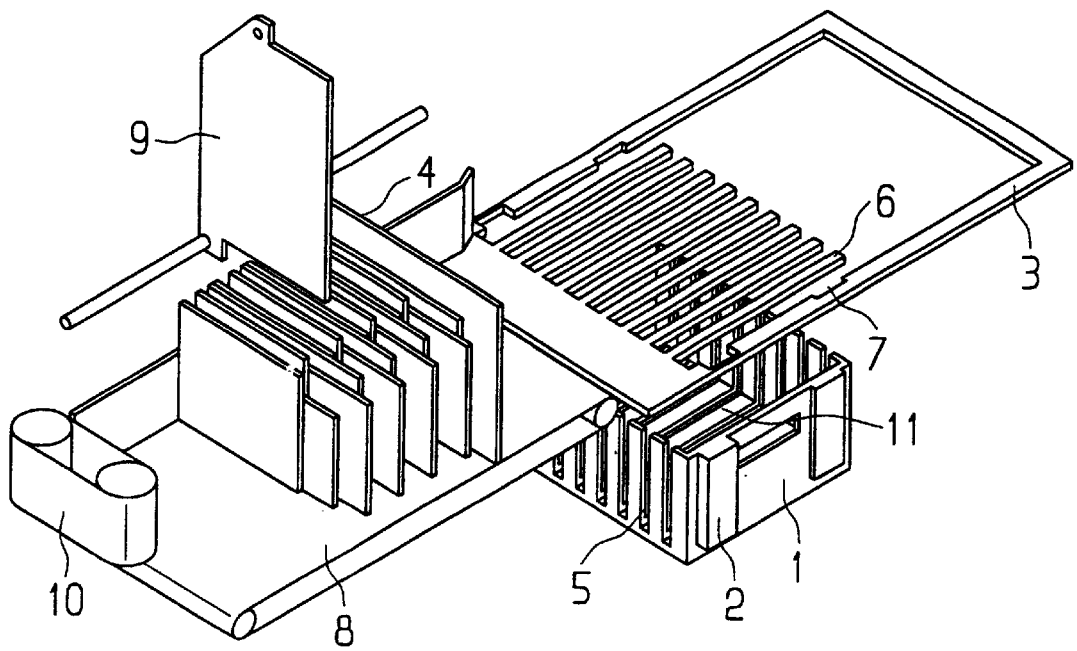
Figure 7:
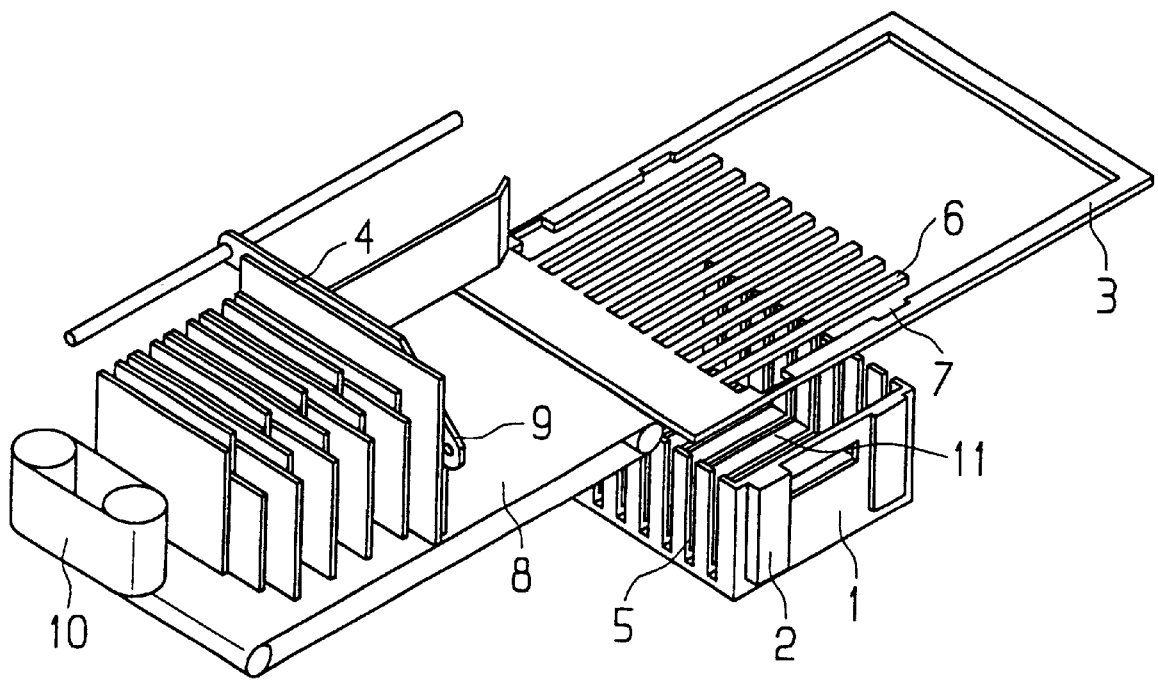

The feeding bed consists of a driven underfloor belt 8, on which the mail pieces 4 are standing, and of a pivotable separator 9 that is also driven. The mail piece stack is pushed by the operator as far as possible to the discharge belts 10 and the separator 9 is swiveled in behind the stack, preventing the stack from falling (FIGS. 6 and 7).

Separator 9 and underfloor belt 8 are then during stack separation moved toward the discharge belt 10 controlled by the pressure of the stack.

Aside from the described semiautomatic emptying process, a fully automatic emptying process is also possible. In this latter process, an automatic conveying system transports a filled mail piece container 1 onto the conveyor belts 3 and pushes the mail piece container in the direction of the material feeder. At the transfer position above the supporting fingers 6 two force-adaptive supports, in this case two also pivotable separators, grab the mail piece stack from both sides. During this process a certain grabbing pressure is maintained. After the mail piece container 1 has moved downward, the two separators push the mail piece stack in the direction of the discharge point, where possibly another stack or partial stack is positioned and held in place by another separator. The transfer and merger into a combined stack is e.g. explained in DE 195 45 716 C1. In the event that the mail pieces 4 are transported in the container in a horizontal position, it is advantageous to equip the supporting fingers 6 with narrow driven transport belts so that the mail pieces, which are lying flat, can be automatically transported.

What is claimed is:

1. An apparatus for transporting a stack of mail pieces, comprising:
    a container having rows of aligned, upwardly opening slots in its front and rear walls and rows of upwardly opening grooves in a bottom wall thereof, wherein each groove spans a pair of slots to form a U-shaped opening; and
    a guide track configured to support the container for sliding horizontal movement thereon in an unloading direction, the guide track including a series of fingers configured to enter the grooves in the bottom wall of the container beneath the stack of mail pieces as the container slides horizontally on the track, and having openings permitting removal of the container from the stack by lowering it beneath the guide track.

2. The apparatus of claim 1 wherein the container further comprises at least one guide member for guiding the container as it is lowered beneath the guide track.

3. The apparatus of claim 1 wherein the guide track comprises at least one guide opening, the guide member engaging the guide opening to guide the container as it is lowered beneath the guide track.

4. The apparatus of claim 1 further comprising a material feeding device for receiving the mail pieces removed from the container.

5. The apparatus of claim 4 wherein the material feeding device comprises a feeding bed and a discharging device.

6. The apparatus of claim 5 wherein the feeding bed comprises a driven underfloor belt and a pivotable separator.

7. The apparatus of claim 5 wherein the discharging device comprises a conveyor belt configured to engage the front mail piece in the stack of mail pieces in a start-stop operation.

8. The apparatus of claim 1 wherein the guide track comprises a plurality of openings configured to match the exterior profile of the container, the openings enabling downward movement of the container through the guide track.

9. An apparatus for transporting a stack of mail pieces comprising:
    a container having a row of aligned, upwardly opening slots in a front wall of the container and a row of upwardly opening grooves in a bottom wall thereof, wherein each groove intersects with a slot at respective ends thereof, the container further comprising at least one guide member;
    a guide track configured to support the container for sliding horizontal movement thereon in an unloading direction, the guide track including a series of fingers configured to enter the grooves in the bottom wall of the container beneath the stack of mail pieces as the container slides horizontally on the track, and having openings permitting removal of the container from the stack by lowering the container beneath the guide track, the guide track further comprising at least one guide opening configured to engage the guide member as the container is lowered.

10. The apparatus of claim 9 wherein each of the grooves spans a pair of slots.

11. The apparatus of claim 10 further comprising a pair of guide members, each of which projects outwardly from a side wall of the container.

12. The apparatus of claim 11 further comprising a pair of guide openings configured to receive the guide members as the container is lowered.

13. The apparatus of claim 12 further comprising a material feeding device for receiving the mail pieces removed from the container.

14. The apparatus of claim 13 wherein the material feeding device comprises a feeding bed and a discharging device.

15. The apparatus of claim 14 wherein the feeding bed comprises a driven underfloor belt and a pivotable separator.

16. The apparatus of claim 15 wherein the discharging device comprises a conveyor belt configured to engage the front mail piece in the stack of mail pieces in a start-stop operation.

17. A method of transporting a stack of mail pieces from a container comprising:
    positioning the container on a guide track configured to support the container for sliding horizontal movement thereon in an unloading direction;
    positioning a series of fingers in a plurality of openings in the front wall of the container, the openings being configured to receive the fingers;

sliding the container on the guide track to position the container and the fingers such that the fingers extend through the openings and into a plurality of grooves formed in the bottom wall of the container, the fingers moving beneath the stack of mail pieces as the container slides horizontally on the track; and lowering the container beneath the guide track and leaving the stack of mail pieces on the fingers.

18. The method of claim 17 further comprising lowering the container through a plurality of openings formed in the guide track, the openings corresponding to the exterior profile of the container.

19. The method of claim 17 further comprising utilizing a driven underfloor belt and a pivotable separator to transport the mail pieces from the guide track.

20. The method of claim 19 further comprising removing mail pieces from the stack with a discharging device, the discharging device comprising a conveyor belt configured to engage the front mail piece in the stack of mail pieces, the conveyor belt engaging the front mail piece in the stack in a start-stop operation.

* * * * *